(12) United States Patent
Fujii et al.

(10) Patent No.: US 9,164,642 B2
(45) Date of Patent: Oct. 20, 2015

(54) TOUCH PANEL

(75) Inventors: Shoji Fujii, Osaka (JP); Yasuro Niguma, Osaka (JP); Keisyu Muraoka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 167 days.

(21) Appl. No.: 13/562,446

(22) Filed: Jul. 31, 2012

(65) Prior Publication Data

US 2013/0032462 A1 Feb. 7, 2013

(30) Foreign Application Priority Data

Aug. 2, 2011 (JP) ................................. 2011-168932

(51) Int. Cl.
*H03K 17/975* (2006.01)
*G06F 3/045* (2006.01)

(52) U.S. Cl.
CPC ....................................... *G06F 3/045* (2013.01)

(58) Field of Classification Search
CPC ...................................................... G06F 3/045
USPC ......................................................... 200/600
See application file for complete search history.

(56) References Cited

U.S. PATENT DOCUMENTS

| 6,464,822 B1 | 10/2002 | Choi et al. |
| 6,589,650 B1 | 7/2003 | Govek et al. |
| 6,632,513 B1 | 10/2003 | Choi et al. |
| 7,534,500 B2 * | 5/2009 | Kobayashi et al. ............ 428/457 |
| 7,705,257 B2 * | 4/2010 | Arione et al. ................. 200/314 |
| 8,279,188 B2 * | 10/2012 | Kusuda et al. ................ 345/173 |
| 2001/0049024 A1 | 12/2001 | Choi et al. |
| 2002/0114934 A1 | 8/2002 | Liu et al. |
| 2002/0122925 A1 | 9/2002 | Liu et al. |
| 2002/0155265 A1 | 10/2002 | Choi et al. |
| 2003/0012936 A1 | 1/2003 | Draheim et al. |
| 2003/0021972 A1 | 1/2003 | Choi et al. |
| 2003/0116270 A1 | 6/2003 | Hawa et al. |
| 2004/0081764 A1 | 4/2004 | Liu et al. |
| 2008/0131624 A1 * | 6/2008 | Egami ..................... G06F 3/045 428/1.1 |
| 2009/0315849 A1 | 12/2009 | Ito |

(Continued)

FOREIGN PATENT DOCUMENTS

| CN | 1446371 | 10/2003 |
| CN | 101578667 | 11/2009 |

(Continued)

OTHER PUBLICATIONS

English Translation of Chinese Search Report dated Dec. 3, 2014 for the related Chinese Patent Application No. 201210272245.0.

*Primary Examiner* — Renee S Luebke
*Assistant Examiner* — Lheiren Mae A Caroc
(74) *Attorney, Agent, or Firm* — Panasonic Patent Center

(57) ABSTRACT

A touch panel includes an upper substrate, an upper conductive layer, a lower substrate, a lower conductive layer, and dot spacers. The upper substrate includes a substrate layer and a hard coat layer disposed on the top surface of the substrate layer. The upper conductive layer is disposed on the bottom of the upper substrate. The lower conductive layer is disposed on the top surface of the lower substrate in such a manner as to confront the upper conductive layer with a predetermined space therebetween. The dot spacers are disposed on the lower conductive layer. The hard coat layer has an outer surface with a ten-point average roughness Rz in the range from 17.7 μm to 40.0 μm, inclusive.

14 Claims, 3 Drawing Sheets

(56) References Cited

U.S. PATENT DOCUMENTS

| | | |
|---|---|---|
| 2010/0260986 A1 | 10/2010 | Ito |
| 2010/0289762 A1* | 11/2010 | Ito .......................... C08J 7/042 345/173 |
| 2011/0084346 A1* | 4/2011 | Mori .............................. 257/415 |
| 2012/0132916 A1* | 5/2012 | Jung .............................. 257/59 |

FOREIGN PATENT DOCUMENTS

| | | |
|---|---|---|
| JP | 2005-107655 | 4/2005 |
| JP | 2011-065407 | 3/2011 |

* cited by examiner

TOUCH PANEL

BACKGROUND

1. Technical Field

The technical field relates to touch panels mainly used to operate various electronic apparatuses.

2. Background Art

Many electronic apparatuses such as mobile phones and electronic cameras have been equipped with a light-transmitting touch panel on the top surface of a liquid crystal display with their increased functionality and diversity in recent years. Such an apparatus allows the user to switch between various functions by touching the panel with a finger, pen, or other pointing device while watching the screen of the liquid crystal display through the panel.

A conventional touch panel will now be described with reference to FIG. 4. In FIG. 4, which is a sectional view of the conventional touch panel, the dimensions of some parts are enlarged for easy understandings.

Touch panel 10 includes upper substrate 1, upper conductive layer 2, lower substrate 3, lower conductive layer 4, a pair of upper electrodes 5, a pair of lower electrodes 6, dot spacers 7, and frame-shaped spacer 8. Of these components, upper substrate 1, upper conductive layer 2, lower substrate 3, lower conductive layer 4, and dot spacers 7 are light-permeable. Rectangular upper conductive layer 2 is disposed on the bottom surface of upper substrate 1. Rectangular lower conductive layer 4 is disposed on the top surface of lower substrate 3.

Upper electrodes 5, which are made, for example, of silver paste are disposed along the left and right edges of upper conductive layer 2 and lower electrodes 6 are disposed along the front and rear edges of lower conductive layer 4 in FIG. 4. One end of each of upper electrodes 5 is extended to the front of the outer periphery of upper substrate 1, and one end of each of lower electrodes 6 is extended to the front of the outer periphery of lower substrate 3. Dot spacers 7 are disposed on the top surface of lower conductive layer 4, whereas spacer 8 is disposed along the inside of the outer periphery between upper substrate 1 and lower substrate 3. Dot spacers 7, which are made of an insulating resin, are shaped like hemispherical domes and arranged at intervals of 2.5 mm or less.

Upper substrate 1 and lower substrate 3 are bonded together at their outer peripheries via an adhesive (not shown) applied to one or both of the top and bottom surfaces of spacer 8. Thus, upper conductive layer 2 and lower conductive layer 4 are opposed to each other with a predetermined space therebetween.

Upper substrate 1 includes substrate layer 11, hard coat layer 12 disposed on the top surface of substrate layer 11, and light diffusing layer 13 disposed on the bottom surface of substrate layer 11. Substrate layer 11 is made, for example, of polyethylene terephthalate. Hard coat layer 12 is made of a synthetic resin such as an acrylic resin mixed with a fluorine-based resin. The top surface of hard coat layer 12 is made lipophilic so as not to leave fingerprints when the user touches it. As a result, hard coat layer 12 has a surface tension of 30 N/mm or less. Light diffusing layer 13 contains an acrylic base, and silicon dioxide filler dispersed in the base. This filler functions to form asperities on the bottom surface of light diffusing layer 13.

Touch panel 10 thus structured is mounted on liquid crystal display 15 and installed on an electronic apparatus. Upper electrodes 5 and lower electrodes 6 are electrically connected to a control circuit (not shown) such as a microcomputer included in the apparatus.

When the user presses the top surface of upper substrate 1 with a finger or pen according to the display on liquid crystal display 15, upper substrate 1 is bent. Under the touched area of upper substrate 1, upper conductive layer 2 comes into contact with lower conductive layer 4. Then, the control circuit sequentially applies voltages to upper electrodes 5 and lower electrodes 6, thereby detecting the touched area from the voltage ratio between these electrodes. This enables switching between various functions of the apparatus.

SUMMARY

The touch panel of according to an embodiment includes an upper substrate, an upper conductive layer, a lower substrate, a lower conductive layer, and dot spacers. The upper substrate includes a substrate layer having a first face and a second face opposite to the first face, and a hard coat layer disposed on the first face of the substrate layer. The upper conductive layer is disposed on the upper substrate at a face closer to the second face than to the first face of the substrate layer. The lower substrate has an inner surface confronting the upper conductive layer. The lower conductive layer is disposed on the inner surface of the lower substrate in such a manner as to confront the upper conductive layer with a predetermined space therebetween. The dot spacers are disposed on the lower conductive layer between the lower conductive layer and the upper conductive layer. The hard coat layer has an outer surface opposite to the substrate layer, and the outer surface has a ten-point average roughness Rz in the range from 17.7 μm to 40.0 μm, inclusive.

DETAILED DESCRIPTION OF PREFERRED EMBODIMENT

Recent touch panels have a variety of methods of operation. More specifically, many touch panels allow the user to perform a flick operation and a pinch operation. A flick operation means to quickly drag a finger across the top surface of the touch panel, whereas a pinch operation means to move two fingers (usually thumb and forefinger) close to or away from each other across the top surface. In a flick operation, the user needs to smoothly leave a finger (thumb) from the touch panel, instead of touching one position or dragging the touched item as in conventional touch panels. To perform a flick or pinch operation, the user lightly slides fingers across the top surface of a touch panel; for this reason, touch panels are preferably capable of detecting a finger touch with a low compressive force. The touch panel of the present embodiment meets this demand.

Figure 1:
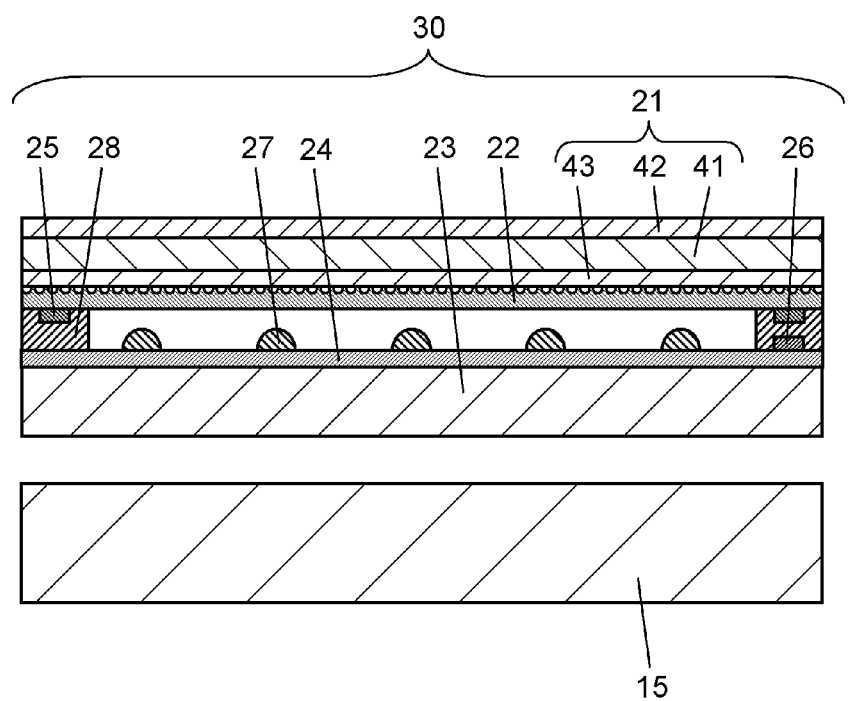
FIG. 1 is a sectional view of a touch panel according to an embodiment.
Figure 2:
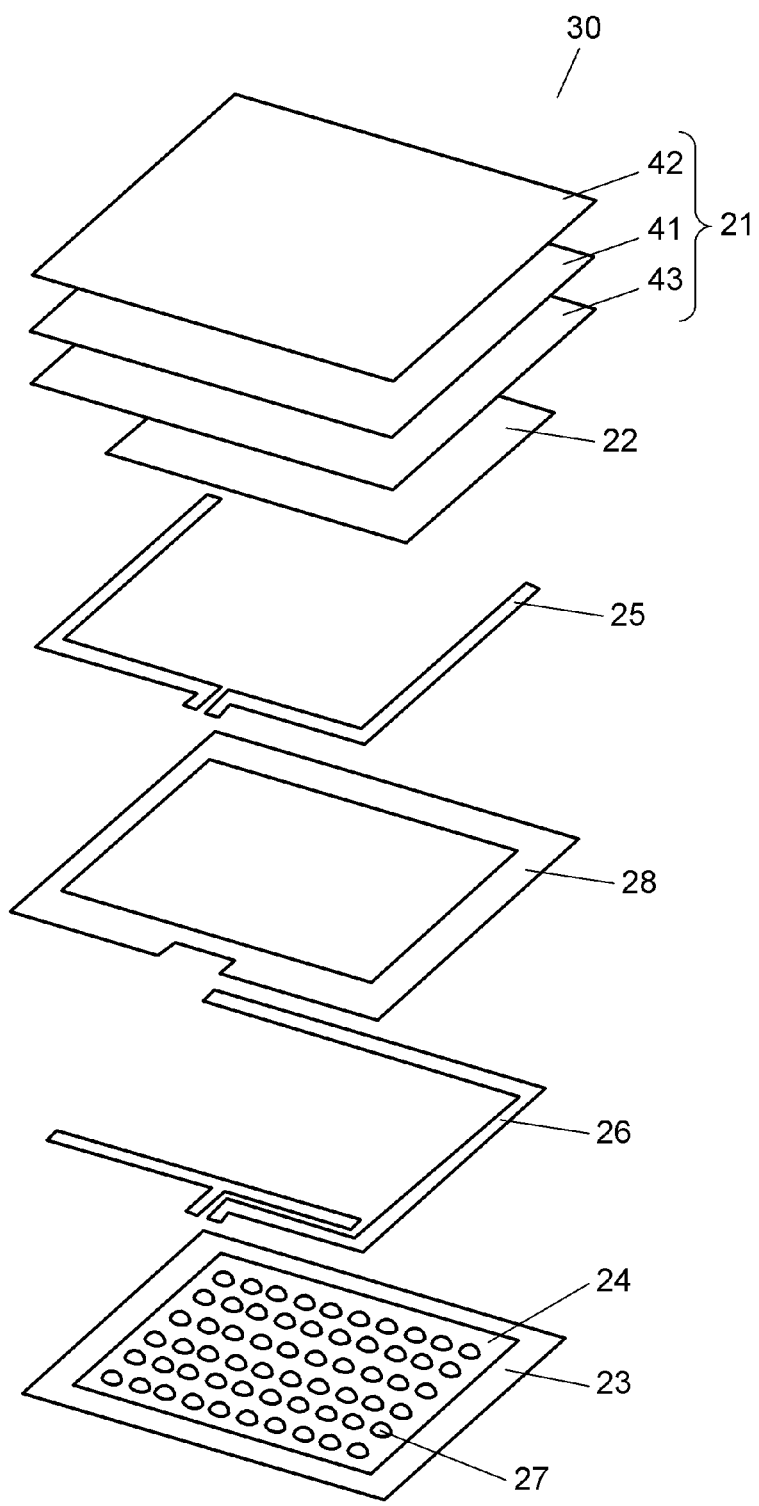
FIG. 2 is an exploded perspective view of the touch panel shown in FIG. 1.

The touch panel of the embodiment will be now described with reference to drawings hereinafter. In these drawings, the dimensions of some parts are enlarged for easy understandings. FIGS. 1 and 2 are a sectional view and an exploded perspective view, respectively, of the touch panel of the embodiment.

Touch panel 30 includes upper substrate 21, upper conductive layer 22, lower substrate 23, lower conductive layer 24, upper electrodes 25, lower electrodes 26, dot spacers 27, and spacer 28.

Upper substrate 21 includes substrate layer 41 having a first face and a second face opposite to the first face; hard coat layer 42 disposed on the first face of substrate layer 41, and light diffusing layer 43 disposed on the second face of substrate layer 41. Upper conductive layer 22 is disposed on light diffusing layer 43 at a face opposite to substrate layer 41. In other words, upper conductive layer 22 is disposed on upper substrate 21 at the face closer to the second face of substrate layer 41 than to the first face. Lower substrate 23 has an inner surface confronting upper conductive layer 22. Lower conductive layer 24 is disposed on the inner surface of lower substrate 23 in such a manner as to oppose upper conductive layer 22 with a predetermined space therebetween. Dot spacers 27 are disposed on lower conductive layer 24 between lower conductive layer 24 and upper conductive layer 22.

Of the components of touch panel 30, at least upper substrate 21, upper conductive layer 22, lower substrate 23, and lower conductive layer 24 are light-permeable. Upper conductive layer 22 and lower conductive layer 24 are substantially rectangular. Upper conductive layer 22 is disposed on almost the entire facing surface of upper substrate 21, whereas lower conductive layer 24 is disposed on almost the entire facing surface of lower substrate 23. Upper conductive layer 22 and lower conductive layer 24 are formed, for example, by sputtering or vacuum depositing a light-transmitting conductive material such as indium tin oxide or tin oxide.

As shown in FIG. 1, the pair of upper electrodes 25 made, for example, of silver are disposed along the left and right edges of upper conductive layer 22, and the pair of lower electrodes 26 are disposed along the front and rear edges of lower conductive layer 24. One end of each of upper electrodes 25 is extended to the front of the outer periphery of upper substrate 21, and one end of each of lower electrodes 26 is extended to the front of the outer periphery of lower substrate 23.

Spacer 28, which is frame-shaped, is disposed along the inside of the outer periphery between upper substrates 21 and lower substrate 23. Upper substrate 21 and lower substrate 23 are bonded together at their outer peripheries via an adhesive (not shown) applied to one or both of the top and bottom surfaces of spacer 28. Thus, upper conductive layer 22 and lower conductive layer 24 confront each other with a predetermined space therebetween. Dot spacers 27, which are made of an insulating resin such as epoxy or silicone, are shaped like hemispherical domes on the top surface of lower conductive layer 24.

Each of these components of touch panel 30 will now be described in details. First, upper substrate 21 will be described. Substrate layer 41 of upper substrate 21 is made of a light-transmitting film such as polyethylene terephthalate, polyethersulfone, or polycarbonate, or a light-transmitting resin board such as an acrylic resin board.

Light diffusing layer 43 is made of a synthetic resin such as an acrylic resin. Layer 43 has minute asperities on its bottom surface so as to diffuse direct light and/or reflected light penetrating into upper substrate 21, thereby preventing Newton's rings from generating. It is preferable, but not essential to dispose light diffusing layer 43.

Hard coat layer 42 is formed by dispersing filler in a synthetic resin such as an acrylic-based resin. This filler is made, for example, of an inorganic oxide such as a silicon dioxide in the form of fine particles with diameters in the range from 0.1 µm to 1.0 µm. Alternatively, hard coat layer 42 is formed of a mixture of an acrylic-based resin and a fluorine-based resin. Hard coat layer 42 has an outer surface (top surface) on the side opposite to substrate layer 41. The outer surface has a ten-point average roughness Rz in the range from 17.7 µm to 40.0 µm, inclusive. The Rz value is thus specified because of the following reason.

In a flick operation, the user slides a finger across the outer surface of hard coat layer 42, and then leaves the finger by releasing the compressive force. In this case, the user needs to smoothly leave the finger from hard coat layer 42.

Small values of Rz indicate that the surface of hard coat layer 42 is smooth. Too small values of Rz, however, prevent a finger from smoothly leaving hard coat layer 42 due to finger oil. For this reason, the value of Rz needs to be not less than 17.7 µm. Too large values of Rz, on the other hand, roughen the outer surface of hard coat layer 42, preventing the user from visually recognizing the display content on liquid crystal display 15 through touch panel 30. For this reason, the value of Rz needs to be not more than 40.0 µm. The upper limit of Rz may, however, be set smaller according to the display content on liquid crystal display 15. Therefore, it is preferable that the value of Rz is as small as possible where it is 17.7 µm or greater, for example in mobile phones, which need to have higher visibility to display small letters on their small screens than car navigation systems, which display a map thereon.

Unlike in conventional touch panel 10, light diffusing layer 43 preferably does not contain filler dispersed therein. This allows light diffusing layer 43 to have finer asperities, thereby preventing the user from recognizing asperities when touching the top surface of upper substrate 21. Thus, the user can smoothly slide a finger across the top surface of upper substrate 21, thereby allowing upper substrate 21 to last longer. This filler is identical to the filler used for hard coat layer 42.

It is also preferable that the outer surface of hard coat layer 42 has a surface tension in the range from 32 N/mm to 38 N/mm, inclusive. The value of the surface tension can be adjusted by changing the compounding ratio of the filler and/or the fluorine-based resin. This range of surface tension can reduce fingerprints on the outer surface of hard coat layer 42 when the user touches it by a finger. To prevent finger oil marks, the surface tension of the outer surface of hard coat layer 42 needs to be 32 N/mm or more. In the case that hard coat layer 42 is made of a resin, the actual surface tension is 38 N/mm or less.

Figure 3:
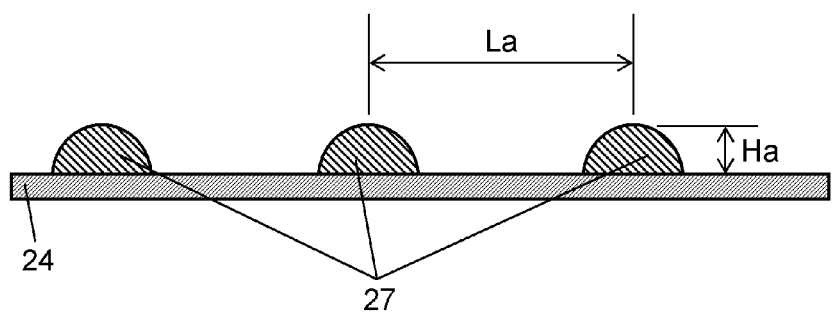
FIG. 3 is a sectional view of an essential part of the touch panel shown in FIG. 1.

The shape of dot spacers 27 will now be described with reference to FIG. 3, which is a sectional view of an essential part of touch panel 30. Dot spacers 27 are arranged on the top surface of lower conductive layer 24 in such a manner that their tops are spaced apart from each other at predetermined intervals La. The intervals La are preferably in the range from 3.5 mm to 4.5 mm, inclusive. Dot spacers 27 preferably have a height Ha in the range from 5 µm to 15 µm, inclusive.

In the case where the intervals La of dot spacers 27 are not less than 3.5 mm, upper conductive layer 22 is more likely to come into contact with lower conductive layer 24. In brief, the compressive force of the user, for example, as low as 0.1 N or less can operate the touch panel. The intervals La of not more than 4.5 mm makes it possible to reduce false detection that can be caused when upper conductive layer 22 comes into contact with lower conductive layer 24 despite the user not touching the upper substrate 21.

In the case where the height Ha of dot spacers 27 is 15 µm or less, upper conductive layer 22 is more likely to come into contact with lower conductive layer 24. The height Ha of not less than 5 µm makes it possible to reduce false detection that can be caused when upper conductive layer 22 comes into contact with lower conductive layer 24 despite the user not touching the upper substrate 21. Since dot spacers 27 are hemispherical domes as mentioned above, a larger height Ha indicates a larger diameter of dot spacers 27. A larger diameter of dot spacers 27 results in lower visibility of liquid crystal display 15 through touch panel 30. From this viewpoint, the height Ha is preferably 15 μm or less. The appropriate ranges of the intervals La and the height Ha of dot spacers 27 are related to the flexibility of upper substrate 21. The above-mentioned appropriate ranges are based on the case where substrate layer 41 is made of a polyethylene terephthalate (PET) film having a thickness of 188 μm, which is a typical thickness. In general, materials used for substrate layer 41 have a Young's modulus in the range from 4 GPa to 5 GPa. The appropriate ranges of the intervals La and the height Ha are determined as mentioned above according to the range of the Young's modulus.

Touch panel 30 thus structured is mounted on liquid crystal display 15 and is installed on an electronic apparatus. Upper electrodes 25 and lower electrodes 26 are electrically connected to a control circuit (not shown) such as a microcomputer included in the apparatus.

The electronic apparatus structured as above operates as follows. When the user presses the top surface of upper substrate 21 with a finger or pen according to the display on liquid crystal display 15 disposed on the rear surface of touch panel 30, upper substrate 21 is bent. Under the touched area of upper substrate 21, upper conductive layer 22 comes into contact with lower conductive layer 24. Then, the control circuit sequentially applies voltages to upper electrodes 25 and lower electrodes 26, thereby detecting the touched area from the voltage ratio between these electrodes.

The outer surface of hard coat layer 42 has a ten-point average roughness Rz of not less than 17.7 μm. As a result, in a flick operation, the user can leave a finger smoothly from the outer surface of hard coat layer 42. The Rz value of not more than 40.0 μm has no influence on the visibility of liquid crystal display 15 through touch panel 30. Furthermore, the outer surface of hard coat layer 42 can be free from fingerprints when having a surface tension of 32 N/mm or more.

Figure 4:
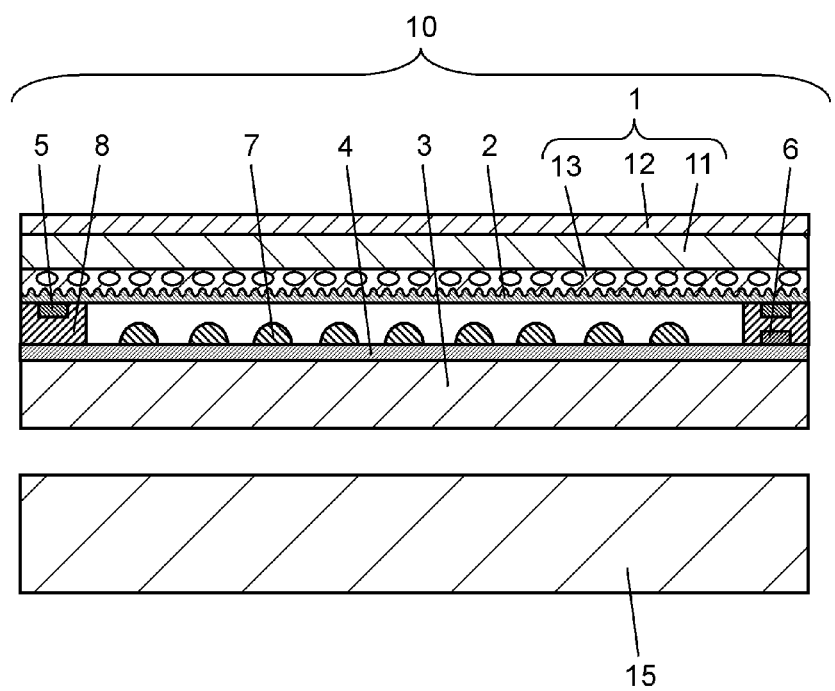
FIG. 4 is a sectional view of a conventional touch panel.

In conventional touch panel 10 shown in FIG. 4, the user needs to apply a compressive force of 0.2 N or more to bring upper conductive layer 2 into contact with lower conductive layer 4 with a finger or pen. A compressive force generated by the user flicking the screen with a finger may be less than 0.2 N, which may not be able to be detected by the control circuit. In touch panel 30, on the other hand, the user needs a much lower compressive force of, for example, 0.1 N or less to bring upper conductive layer 22 into contact with lower conductive layer 24.

In a flick operation, the user slides a finger across the top surface of upper substrate 21, and lightly snaps it. In this case, too, touch panel 30 can be operated with a lower compressive force than conventional touch panels, allowing the control circuit to detect changes in touch position from the voltage ratio of upper electrodes 25 to lower electrodes 26. Thus, various functions of the electronic apparatus can be switched according to the user's operation to touch panel 30.

In the aforementioned description, upper substrate 21 at least includes substrate layer 41 and hard coat layer 42, which are integrated with each other. Alternatively, a protective sheet having an outer surface with an Rz in the range from 17.7 μm to 40.0 μm may be applied to the outer surface of the upper substrate made of a given material while maintaining similar effects.

The following is a description of the consideration results of the appropriate ranges of the ten-point average roughness Rz of the outer surface of hard coat layer 42. First, a thin film corresponding to hard coat layer 42 is formed on a smooth PET film corresponding to substrate layer 41. The thin film is formed by dispersing silicon dioxide fine particles of different sizes into acrylic resin. Then, the surface roughness is evaluated by measuring the ten-point average roughness Rz, the arithmetic average roughness Ra, and the root mean square roughness Rq. The methods for measuring these parameters are defined in JIS and ISO. Each of these measured parameter values is determined from the average value of two positions on the outer surface of the thin film corresponding to hard coat layer 42.

A flick operation is actually performed on the surface of this thin film so that the operability (slippage) can be evaluated sensuously. Furthermore, the surface tension of the thin film is evaluated by the method specified in ISO 8296. More specifically, a plurality of test liquids with different surface tensions are chosen one by one and applied to the surface, thereby determining whether the liquid film is maintained for at least two seconds. Then, the highest surface tension is determined to be the surface tension of the thin film.

Furthermore, liquid crystal display 15 is disposed under the PET film, and then a map used for car navigation systems is displayed so that visibility can be evaluated sensuously. The evaluation results are shown in Table 1.

TABLE 1

| samples | Rz (μm) | Ra (μm) | Rq (μm) | slippage | surface tension (N/mm) | visibility |
| --- | --- | --- | --- | --- | --- | --- |
| A | 13.160 | 0.389 | 0.517 | NG | 32 | OK |
| B | 17.765 | 0.357 | 0.500 | OK | 36 | OK |
| C | 17.951 | 0.259 | 0.375 | OK | 34 | OK |
| D | 19.178 | 0.344 | 0.502 | OK | 34 | OK |
| E | 31.608 | 0.351 | 0.524 | OK | 36 | OK |

In Samples B to E, the Rz values are in the range from 17.7 μm to 40.0 μm, inclusive, indicating excellence in slippage and visibility. On the other hand, sample A, having the Rz value lower than 17.7 μm, indicates that a flick operation may cause the thin film to stick to a finger, thereby reducing operability. In all of Samples A to E, the Rz values are less than 40.0 μm, indicating good visibility.

In all of Samples A to E, the surface tension values are in the range from 32 N/mm to 38 N/mm, inclusive, indicating that the thin film is unlikely to leave fingerprints.

A comparison of evaluation results between Samples A and B indicates that Samples A and B are less different in Ra and Rq values than in Rz value. A comparison of evaluation results between Samples A and C indicates that Sample C has a larger Rz value than Sample A, but has smaller Ra and Rq values than Sample A. These results indicate that Rz is the most appropriate index to evaluate slippage.

As described hereinbefore, the touch panel of the according to the above embodiments is useful to operate various electronic apparatuses because of its diverse operations.

What is claimed is:
1. A touch panel comprising:
   an upper substrate including:
      a substrate layer having a first face and a second face opposite to the first face; and
      a hard coat layer disposed on the first face of the substrate layer;

an upper conductive layer disposed on the upper substrate at a face closer to the second face than to the first face of the substrate layer;
a lower substrate having an inner surface confronting the upper conductive layer;
a lower conductive layer disposed on the inner surface of the lower substrate, and confronting the upper conductive layer with a predetermined space therebetween; and
dot spacers disposed on the lower conductive layer between the lower conductive layer and the upper conductive layer,
wherein the hard coat layer includes an acrylic-based resin and silicon dioxide particles dispersed in the acrylic resin,
wherein the hard coat layer has an outer surface opposite to the substrate layer, and having a ten-point average roughness Rz in a range from 17.7 μm to 40.0 μm, inclusive,
wherein the ten-point average roughness of the hard coat layer is configured so that the touch panel recognizes a flick operation performed by a user on the hard coat layer.

2. The touch panel according to claim 1, wherein the upper substrate further includes a light diffusing layer disposed on the second face of the substrate layer, the light diffusing layer being made of a light-transmitting resin and free from filler.

3. The touch panel according to claim 1, wherein the dot spacers have a height in a range from 5 μm to 15 μm, inclusive, and
tops of any two of the dot spacers are apart from each other at intervals in a range from 3.5 mm to 4.5 mm, inclusive.

4. The touch panel according to claim 1, wherein the outer surface of the hard coat layer has a surface tension in a range from 32 N/mm to 38 N/mm, inclusive.

5. The touch panel according to claim 1, wherein the upper conductive layer can be brought into contact with the lower conductive layer in response to a compressive force of 0.1 N or less during the flick operation.

6. The touch panel according to claim 1, wherein a diameter of each of the silicon dioxide particles falls within a range from 0.1 μm to 1.0 μm, inclusive.

7. The touch panel according to claim 1, wherein the substrate layer has a Young's modulus in the range from 4 GPa to 5 GPa.

8. A touch panel comprising:
an upper substrate including:
    a substrate layer having a first face and a second face opposite to the first face; and
    a hard coat layer disposed on the first face of the substrate layer;
an upper conductive layer disposed on the upper substrate at a face closer to the second face than to the first face of the substrate layer;
a lower substrate having an inner surface confronting the upper conductive layer;
a lower conductive layer disposed on the inner surface of the lower substrate, and confronting the upper conductive layer with a predetermined space therebetween; and
dot spacers disposed on the lower conductive layer between the lower conductive layer and the upper conductive layer,
wherein the hard coat layer includes an acrylic-based resin and a fluorine-based resin,
wherein the hard coat layer has an outer surface opposite to the substrate layer, and having a ten-point average roughness Rz in a range from 17.7 μm to 40.0 μm, inclusive,
wherein the ten-point average roughness of the hard coat layer is configured so that the touch panel recognizes a flick operation performed by a user on the hard coat layer.

9. The touch panel according to claim 8, wherein the upper substrate further includes a light diffusing layer disposed on the second face of the substrate layer, the light diffusing layer being made of a light-transmitting resin and free from filler.

10. The touch panel according to claim 8, wherein the dot spacers have a height in a range from 5 μm to 15 μm, inclusive, and
tops of any two of the dot spacers are apart from each other at intervals in a range from 3.5 mm to 4.5 mm, inclusive.

11. The touch panel according to claim 8, wherein the outer surface of the hard coat layer has a surface tension in a range from 32 N/mm to 38 N/mm, inclusive.

12. The touch panel according to claim 8, wherein the upper conductive layer can be brought into contact with the lower conductive layer in response to a compressive force of 0.1 N or less during the flick operation.

13. A touch panel comprising:
an upper substrate including:
    a substrate layer having a first face and a second face opposite to the first face; and
    a hard coat layer disposed on the first face of the substrate layer;
an upper conductive layer disposed on the upper substrate at a face closer to the second face than to the first face of the substrate layer;
a lower substrate having an inner surface confronting the upper conductive layer;
a lower conductive layer disposed on the inner surface of the lower substrate, and confronting the upper conductive layer with a predetermined space therebetween; and
dot spacers disposed on the lower conductive layer between the lower conductive layer and the upper conductive layer, wherein:
the dot spacers have a height in a range from 5 μm to 15 μm, inclusive;
tops of any two of the dot spacers are apart from each other at intervals in a range from 3.5 mm to 4.5 mm, inclusive;
the hard coat layer includes an acrylic-based resin, and silicon dioxide particles dispersed in the acrylic resin and has an outer surface opposite to the substrate layer, and having a ten-point average roughness Rz in a range from 17.7 μm to 40.0 μm, inclusive;
a diameter of each of the silicon dioxide particles falls within a range from 0.1 μm to 1.0 μm, inclusive;
the ten-point average roughness of the hard coat layer is configured so that the touch panel recognizes a flick operation performed by a user on the hard coat layer; and
wherein the upper conductive layer can be brought into contact with the lower conductive layer in response to a compressive force of 0.1 N or less during the flick operation.

14. The touch panel according to claim 13, wherein the substrate layer has a Young's modulus in the range from 4 GPa to 5 GPa.

* * * * *